United States Patent
Patel et al.

(10) Patent No.: US 11,679,731 B2
(45) Date of Patent: Jun. 20, 2023

(54) REMOTE SENSOR COMMUNICATION ADAPTIVE SYNCHRONIZATION CONTROL FOR RESTRAINT CONTROL SYSTEM

(71) Applicant: VEONEER US, INC., Southfield, MI (US)

(72) Inventors: Bankim Patel, Southfield, MI (US); Vincent Colarossi, Southfield, MI (US); Phillippe Aubertin, Southfield, MI (US); Haitham Islim, Southfield, MI (US); Ron Wantuck, Southfield, MI (US); Stuart Koch, Southfield, MI (US)

(73) Assignee: VEONEER US, LLC, Southfield, MI (US)

( * ) Notice: Subject to any disclaimer, the term of this patent is extended or adjusted under 35 U.S.C. 154(b) by 250 days.

(21) Appl. No.: 16/892,857

(22) Filed: Jun. 4, 2020

(65) Prior Publication Data

US 2021/0380061 A1     Dec. 9, 2021

(51) Int. Cl.
| | |
|---|---|
| *B60R 21/0132* | (2006.01) |
| *B60R 21/015* | (2006.01) |
| *H04L 67/12* | (2022.01) |
| *H04Q 9/00* | (2006.01) |
| *H04L 12/40* | (2006.01) |
| *B60R 21/01* | (2006.01) |

(52) U.S. Cl.
CPC .. *B60R 21/01332* (2014.12); *B60R 21/01554* (2014.10); *H04L 12/40* (2013.01);
(Continued)

(58) Field of Classification Search
CPC ........ B60R 21/01332; B60R 21/01554; B60R 2021/01054; B60R 2021/01129;
(Continued)

(56) References Cited

U.S. PATENT DOCUMENTS

| 8,775,029 B2 * | 7/2014 | Hammerschmidt .... H04L 1/203 701/45 |
| 9,007,951 B2 | 4/2015 | Reidl et al. |

(Continued)

OTHER PUBLICATIONS

International Search Report in corresponding PCT application No. PCT/US2021/035621, dated Sep. 8, 2021.
(Continued)

*Primary Examiner* — Abdullahi Ahmed
(74) *Attorney, Agent, or Firm* — Dickinson Wright PLLC

(57) ABSTRACT

An electronic controller of a restraint control system for a vehicle comprises an electronic control unit including a first serial interface. The electronic controller also comprises a communications controller including a second serial interface and a plurality of PSI5 (Peripheral Sensor Interface 5) digital communications interfaces. Each of the first and second serial interfaces are Serial Peripheral Interfaces (SPI) in direct communications with one another, and the digital communications interfaces are each configured to communicate with a remote sensor. The communications controller is configured to transmit a voltage sync pulse to each of the remote sensors via the PSI5 digital communications interfaces in response to a synchronization command received from the electronic control unit via the serial interconnection. The voltage sync pulses on each of the PSI5 interfaces may be staggered and non-overlapping to reduce EMI production and to reduce the current load of the electronic controller.

18 Claims, 2 Drawing Sheets

(52) U.S. Cl.
CPC ............... *H04L 67/12* (2013.01); *H04Q 9/00* (2013.01); *B60R 2021/01054* (2013.01); *B60R 2021/01129* (2013.01); *B60R 2021/01265* (2013.01); *H04L 2012/40273* (2013.01)

(58) Field of Classification Search
CPC ........... B60R 2021/01265; H04L 12/40; H04L 67/12; H04L 2012/40273; H04L 7/044; H04L 7/06; H04L 12/4015; H04L 12/40006; H04Q 9/00; G08C 19/00
See application file for complete search history.

(56) References Cited

U.S. PATENT DOCUMENTS

| | | | |
|---|---|---|---|
| 9,836,341 B2 * | 12/2017 | Hammerschmidt | .. G06F 11/076 |
| 2006/0089756 A1 | 4/2006 | Iwagami | |
| 2014/0241414 A1 * | 8/2014 | Reidl | ................... H04L 25/4904 |
| | | | 375/238 |
| 2014/0301432 A1 | 10/2014 | Szuees et al. | |
| 2015/0078498 A1 | 3/2015 | Hamperl | |
| 2018/0087930 A1 * | 3/2018 | Motz | ..................... G01D 5/2457 |
| 2018/0198545 A1 | 7/2018 | Aichriedler | |
| 2018/0198546 A1 | 7/2018 | Aichriedler | |
| 2018/0266885 A1 * | 9/2018 | Kawai | ...................... G01J 5/048 |
| 2018/0285296 A1 | 10/2018 | Rota | |
| 2019/0334511 A1 * | 10/2019 | Eggermont | .............. H03K 4/00 |
| 2020/0235763 A1 * | 7/2020 | Ito | ........................... G08C 25/00 |
| 2022/0080913 A1 * | 3/2022 | Abaza | ..................... H04L 12/40 |

OTHER PUBLICATIONS

Article entitled "Peripheral Sensor Interface 5"; retrieved from Wikipedia Feb. 20, 2020; https://en.wikipedia.org/wiki/Peripheral_Sensor_Interface_5.

* cited by examiner

REMOTE SENSOR COMMUNICATION ADAPTIVE SYNCHRONIZATION CONTROL FOR RESTRAINT CONTROL SYSTEM

BACKGROUND

Enhancements in automotive safety systems over the past several decades have provided dramatic improvements in vehicle occupant protection. Presently available motor vehicles include an array of such systems, including inflatable restraint systems for protection of occupants from frontal impacts, side impacts, and roll-over conditions. Advancements in restraint belts and vehicle interior energy absorbing systems have also contributed to enhancements in safety. Many of these systems must be deployed or actuated in a non-reversible manner upon the detection of a vehicle impact to provide their beneficial effect. Many designs for such sensors are presently used to detect the presence of an impact or roll-over condition as it occurs.

PSI5 communication interfaces are used in many different applications including restraint control modules for communicating with various sensors in a vehicle. PSI5 communication interfaces employ a two-wire interconnection with a voltage sync pulse for synchronizing signal sampling and communication with modulation current for transmitting sensor data.

Electronic controllers for restraint systems commonly include an electronic control unit, such as a microprocessor or a microcontroller, and one or more communications controllers configured to communicate with one or more remote sensors via PSI5 communications interfaces. Electronic control units in such electronic controllers are commonly connected to the communications controllers with both a serial data interconnection and with a digital input/output (I/O) connection that is used by the communications controllers for synchronizing communications on the PSI5 communications interfaces.

SUMMARY

According to one or more embodiments, an electronic controller comprises an electronic control unit including a first serial interface. The electronic controller also comprises a communications controller including a second serial interface and a digital communications interface. The second serial interface is in direct communication with the first serial interface via a serial interconnection, and the digital communications interface is configured to communicate with a remote sensor. The communications controller is configured to transmit a voltage sync pulse via the digital communications interface to a remote sensor in response to a synchronization command received from the electronic control unit via the serial interconnection.

According to one or more embodiments, a communications controller comprises a serial interface and a digital communications interface configured to communicate with a remote sensor. The communications controller is configured to transmit a voltage sync pulse via the digital communications interface to the remote sensor in response to a synchronization command received via the serial interface.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

As used herein the term 'controller' refers to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the controllers described below can be combined and/or further partitioned.

Referring now to the figures, where the technical solutions will be described with reference to specific embodiments, without limiting same, for implementation of the disclosed embodiments.

Figure 1A:
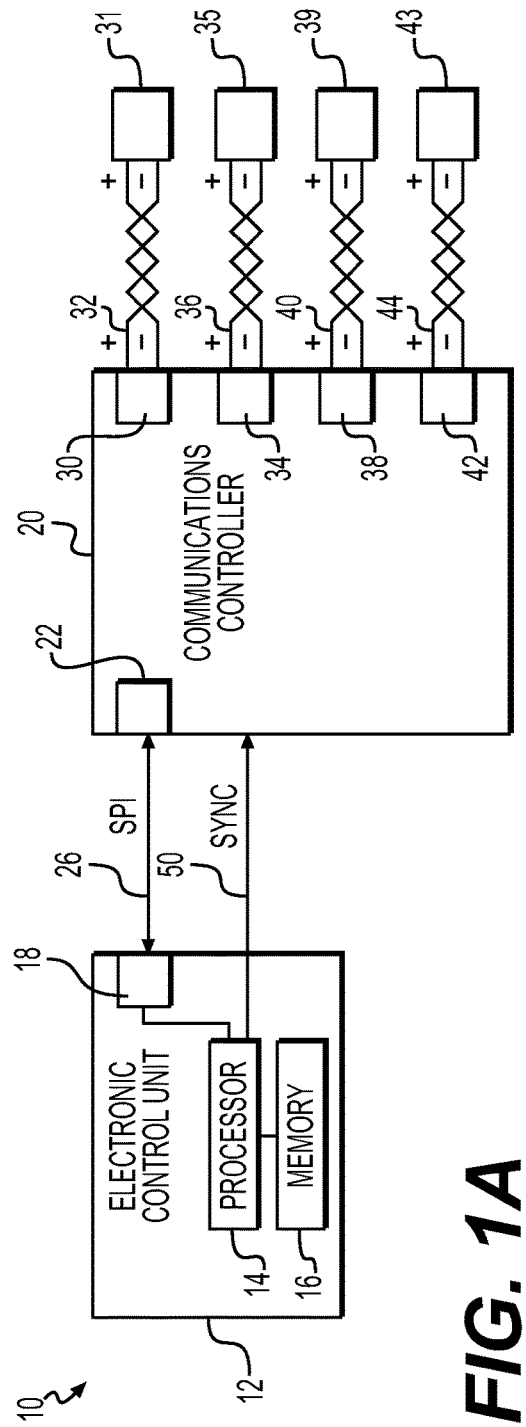
FIG. 1A is a schematic block diagram showing a conventional electronic controller of a restraint control system.

FIG. 1A is a schematic block diagram showing a first electronic controller 10 having a conventional design and which may be used, for example, in a restraint control system of a motor vehicle. The first electronic controller 10 includes an electronic control unit 12, such as a microprocessor or microcontroller. Alternatively or additionally, the electronic control unit 12 may include one or more specialized processing devices, such as an application-specific integrated circuit (ASIC) or processing devices having a specialized configuration, such as a field programmable gate array (FPGA). Alternatively or additionally, the electronic control unit 12 may include a combination of one or more general-purpose processors with specialized hardware components.

The electronic control unit 12 includes a processor 14 coupled to a machine-readable storage memory 16, which may include memory integrated within a same physical device as the one or more processors and/or storage memory on one or more separate memory devices, such as programmable read-only memory (e.g. FLASH memory), optical, and/or magnetic media. The processor 14 is configured to execute instructions stored on the machine-readable storage memory 16 and to take some action based on those instructions. The electronic control unit 12 may take the form of a microcontroller unit (MCU). The electronic control unit 12 may include two or more processors 14, which may be integrated into a single device or which may be distributed between two or more physical devices.

As shown in FIG. 1A, the electronic control unit 12 also includes a first serial interface 18 that coupled to the processor 14 for communicating with one or more external devices. The first serial interface 18 may be a Serial Peripheral Interface (SPI). Specifically, the first serial interface 18 may employ the SPI serial communication interface specification with a four-wire serial bus. However, the first serial interface 18 may employ another communications interface, which may be a standards-based interface, such as universal serial bus (USB) and/or a non-standard interface. The first serial interface 18 may be configured to use the four-wire bus of the SPI specification. However, the first serial interface 18 may be configured to use an interconnection bus having any number of conductors.

As shown in FIG. 1A, the first electronic controller 10 also includes a first communications controller 20 configured to communicate with a plurality of remote sensors 31, 35, 39, 43, where 31 could be a single sensor or a connection of multiple sensors, 35 could be a single sensor or a connection of multiple sensors, 39 could be a single sensor or a connection of multiple sensors, and 43 could be a single sensor or a connection of multiple sensors. The first communications controller 20 may be conventional design that includes a general-purpose device and/or a special-purpose device, such as an application specific integrated circuit (ASIC). The first communications controller 20 includes a second serial interface 22 in direct communication with the first serial interface 18 via a serial interconnection 26.

The first communications controller 20 also includes several digital communications interfaces 30, 34, 38, 42 each configured to communicate with a corresponding remote sensor 31, 35, 39, 43. Specifically, the first communications controller 20 includes a first digital communications interface 30 configured to communicate with a first remote sensor 31 via a first interface cable 32; a second digital communications interface 34 configured to communicate with a second remote sensor 35 via a second interface cable 36; a third digital communications interface 38 configured to communicate with a third remote sensor 39 via a third interface cable 40; and a fourth digital communications interface 42 configured to communicate with a fourth remote sensor 43 via a fourth interface cable 44. The first communications controller 20 shown in FIG. 1A includes four of the digital communications interfaces 30, 34, 38, 42. However, the first communications controller 20 may include any number of digital communications interfaces 30, 34, 38, 42. Each of the interface cables 32, 36, 40, 44 is a two-wire twisted-pair cable to limit generation and/or receiving of electromagnetic interference (EMI).

Each of the digital communications interfaces 30, 34, 38, 42 are configured to use PSI5 compliant signaling to communicate with a corresponding one of the remote sensors 31, 35, 39, 43 using the Peripheral Sensor Interface 5 (PSI5) standard. PSI5 compliance may include timing and other characteristics, such as current level, for timing and/or data transmission. PSI5 is a digital interface standard for sensors that employs a two-wire interconnection. PSI5 is used to connect peripheral sensors to electronic control devices in a number of different automotive systems. PSI5 supports both point-to-point and bus configurations, with asynchronous and synchronous communication.

PSI5 operates on the principle of current interface modulation of a transmitting current for data transfer on a power supply lead. A high level of interference resistance is achieved thanks to the relatively high signal current amplitude and the use of Manchester hit coding, with the result that it is sufficient to use an economical two-wire lead for wiring.

Sensors having a PSI5 interface, and correspondingly also receivers and transceivers for receiving sensor data, have been used for many years in the automotive sector. Bidirectional communication is also possible via the synchronization pulses, the data occurring from the control device to the sensor via the presence or absence of synchronization pulses.

The first electronic controller 10 shown in FIG. 1A also includes a synchronization interconnection 50 between the electronic control unit 12 and the first communications controller 20. The synchronization interconnection 50 may be coupled to a digital output driven by the processor 14 transmit a timing synchronization signal to the first communications controller 20. The first communications controller 20 is configured to transmit voltage sync pulses via the digital communications interfaces 30, 34, 38, 42 in response to the timing synchronization signal received via the synchronization interconnection 50.

Figure 1B:
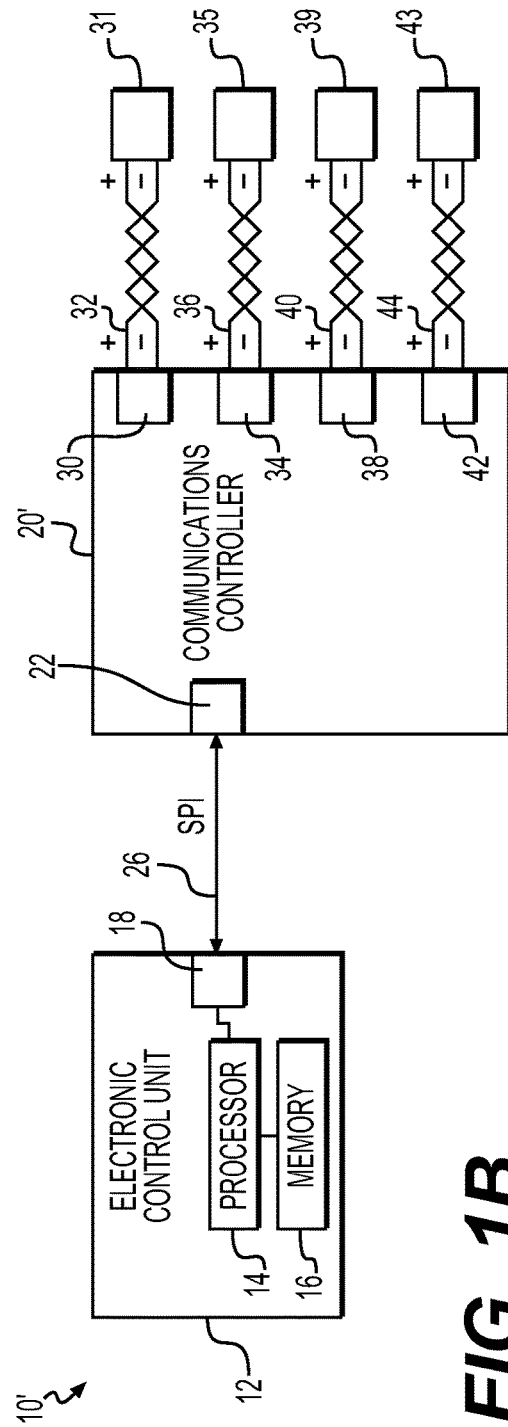
FIG. 1B is a schematic block diagram showing an electronic controller of a restraint control system according to aspects of the present disclosure.

FIG. 1B is a schematic block diagram showing a second electronic controller 10' of a restraint control system according to aspects of the present disclosure. The restraint control system may monitor and/or operate one or more active and/or passive restraints in a motor vehicle. The restraint control system may also be configured to communicate with one or more sensors in order to monitor status of components of the restraints and/or other vehicle parameters related to operation of the restraints. The second electronic controller 10' of FIG. 1B may be similar or identical to the first electronic controller 10 shown in FIG. 1A, but without the synchronization interconnection 50. Instead, the second electronic controller 10' of FIG. 1B includes a second communications controller 20', different from the first communications controller 20, and which is configured to transmit voltage sync pulses via the digital communications interfaces 30, 34, 38, 42 in response to a synchronization command received from the electronic control unit 12 via the serial interconnection 26. The serial interconnection 26 without the synchronization interconnection 50, as shown in FIG. 1B, can provide a cost savings and higher reliability design by eliminating I/O pins on each of the electronic control unit 12 and the second communications controller 20'. Furthermore, the second electronic controller 10' may have a more simplified construction without a conductor for the synchronization interconnection 50. In some embodiments, the serial interconnection 26 is the only interface between the electronic control unit 12 and second communications controller 20'. In other words, there may be no other data interconnections, except for serial interconnection 26 for transmission of signals directly and/or indirectly between the electronic control unit 12 and second communications controller 20'.

Figure 2:
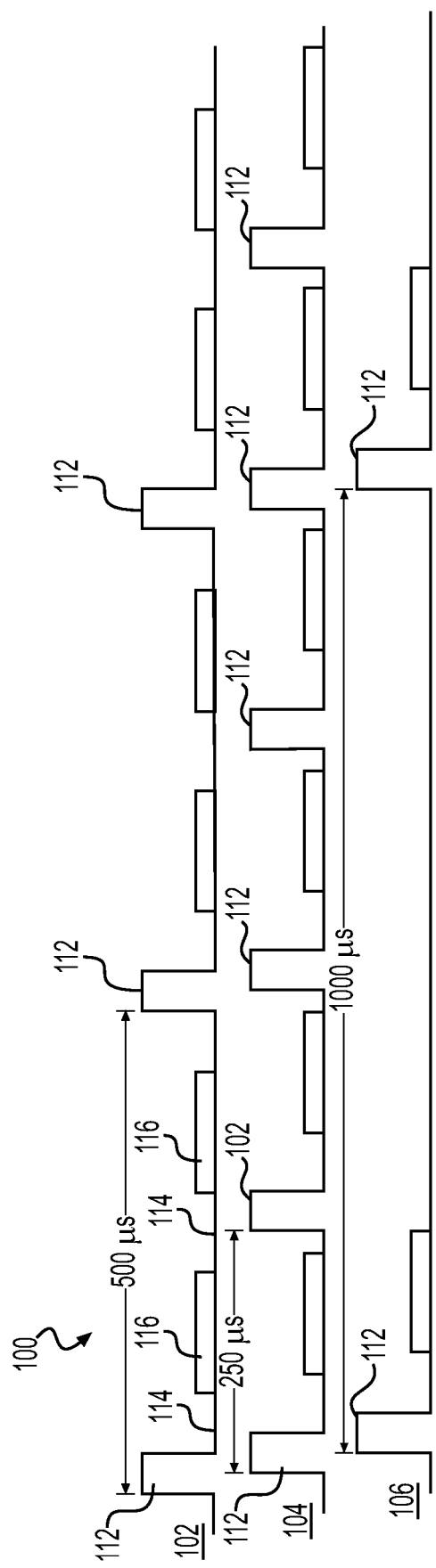
FIG. 2 is a timing diagram showing signals on a digital communications interface according to aspects of the present disclosure.

FIG. 2 is a first timing diagram 100 showing signals on one of the digital communications interfaces 30, 34, 38, 42 according to aspects of the present disclosure. In other words, FIG. 2 shows signals produced by the second electronic controller 10'. Specifically, the first timing diagram 100 includes plots 102, 104, 106 showing signals on one of the interface cables 32, 36, 40, 44. Each of the plots includes a series of voltage sync pulses 112 at regular intervals of time, with current modulated data being transmitted between the voltage sync pulses 112 as no current modulation transmission window 114 and current modulated data signals 116. Note that the voltage sync pulses 112 are in units of volts and the current modulated data signals 116 are in units of mA. This is a feature of the PSI5 standard.

The first plot 102 shown on FIG. 2 illustrates a given one of the digital communications interfaces 30, 34, 38, 42 operating at a 2 kHz data rate, with the voltage sync pulses 112 at 500 μs intervals. The second plot 104 shown on FIG. 2 illustrates a given one of the digital communications interfaces 30, 34, 38, 42 operating at a 4 kHz data rate, with the voltage sync pulses 112 at 250 μs intervals. The third plot 106 shown on FIG. 2 illustrates a given one of the digital communications interfaces 30, 34, 38, 42 operating at a 1 kHz data rate, with the voltage sync pulses 112 at 1000 μs intervals. The plots 102, 104, 106 shown on the first timing diagram 100 show an example of a variable data rate of the given one of the digital communications interfaces 30, 34, 38, 42, which may be generated by the second communications controller 20' in response to commands received from the electronic control unit 12 via the serial interconnection 26.

In some embodiments, the second communications controller 20' may transmit a plurality of the voltage sync pulses 112 at regular intervals in response to a command received from the electronic control unit 12 via the serial interconnection 26. For example, the second communications controller 20' may produce and transmit the voltage sync pulses 112 every 250 μs on a given one of the one of the digital communications interfaces 30, 34, 38, 42 in response to a single command received from the electronic control unit 12 via the serial interconnection 26.

In some embodiments, the electronic control unit 12 may control the timing of the voltage sync pulses 112 by varying timing of serial communications messages sent to the second communications controller 20' via the serial interconnection 26. For example, the second communications controller 20' may generate a voltage sync pulse 112 on a given one of the digital communications interfaces 30, 34, 38, 42 immediately after or a predetermined time after receiving a corresponding message from the electronic control unit 12 via the serial interconnection 26. In some embodiments, the second communications controller 20' is configured to transmit the voltage sync pulse 112 by each of the digital communications interfaces 30, 34, 38, 42 in response to a single synchronization command received from the electronic control unit 12 via the serial interconnection 26.

In some embodiments, the second communications controller 20' is configured to change the regular interval between the voltage sync pulses 112 in response to a data rate command received from the electronic control unit 12 via the serial interconnection 26. For example, the electronic control unit 12 may send periodic messages to the second communications controller 20' every 250 μs. A particular one of the serial communications messages may instruct the second communications controller 20' to generate voltage sync pulses 112 using the first digital communications interface 30 at each periodic message, thus causing the first digital communications interface 30 to operate at a 4 kHz data rate. Another data rate command may instruct the second communications controller 20' to generate voltage sync pulses 112 using the first digital communications interface 30 at every second periodic message, thus causing the first digital communications interface 30 to operate at a 2 kHz data rate.

In some embodiments, the second communications controller 20' is configured to transmit the voltage sync pulses 112 by two or more of the digital communications interfaces 30, 34, 38, 42 at different timing intervals in response to the synchronization command received from the electronic control unit 12 via the serial interconnection 26. For example, and as shown in FIG. 2, the second communications controller 20' may generate voltage sync pulses 112 using the second digital communications interface 34 at each periodic message, while also generating voltage sync pulses 112 using the first digital communications interface 30 at every second periodic message, thus causing the second digital communications interface 34 to operate at a 4 kHz data rate and the first digital communications interface 30 to operate at a 2 kHz data rate. A different one of the serial communications messages may instruct the second communications controller 20' to generate voltage sync pulses 112 using the second digital communications interface 34 at a different rate such as, for example, every fourth one of the periodic messages, thus causing the second digital communications interface 34 to operate at a 1 kHz data rate. Please note that these are merely examples, and that different data rates may also be used. Also, the second communications controller 20' may generate the voltage sync pulses 112 using a different timing source, such as a real-time clock or a clock signal from another source.

Figure 3:
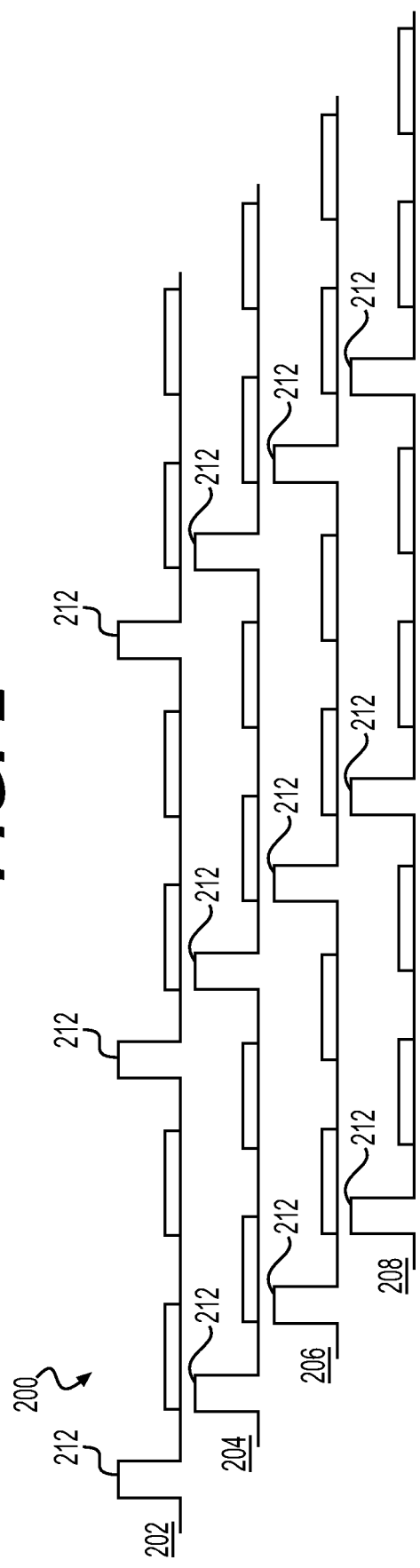
FIG. 3 is a timing diagram showing signals on four different digital communications interfaces according to aspects of the present disclosure.

FIG. 3 is a second timing diagram 200 showing signals on each of the digital communications interfaces 30, 34, 38, 42 according to aspects of the present disclosure. In other words, FIG. 3 shows signals produced by the second electronic controller 10'. Specifically, the second timing diagram 200 includes a fourth plot 202 showing signals on the first interface cable 32; a fifth plot 204 showing signals on the second interface cable 36; a sixth plot 206 showing signals on the third interface cable 40; and a seventh plot 208 showing signals on the fourth interface cable 44.

In some embodiments, and as shown in the second timing diagram 200, the voltage sync pulses 212 on each of the digital communications interfaces 30, 34, 38, 42 may be transmitted by the second communications controller 20' at different times. More specifically, the second digital communications interface 34 (shown on plot 204) may transmit a voltage sync pulse 212 a short time after a corresponding voltage sync pulse 212 is transmitted by the first digital communications interface 30 (shown on plot 202). Similarly, the third digital communications interface 38 (shown on plot 206) may transmit a voltage sync pulse 212 a short time after a corresponding voltage sync pulse 212 is transmitted by the second digital communications interface 34 (shown on plot 204). This short delay may be called a lag time. In some embodiments, and as shown in FIG. 3 the lag time is about equal to the duration of each of the voltage sync pulses 212. This staggering to produce the voltage sync pulses 212 at non-overlapping times can reduce the peak transient current amplitude demands and reduce the production of electromagnetic interference (EMI) of the second electronic controller 10'

This functionality of producing the non-overlapping voltage sync pulses may be implemented in either of the electronic control unit 12 or the second communications controller 20'. In some embodiments, for example, the electronic control unit 12 may be programmed or otherwise configured to produce and send commands to the second communications controller 20' at the staggered intervals corresponding to the lag times to cause the second communications controller 20' to transmit the voltage sync pulses 212 on different ones of the digital communications interfaces 30, 34, 38, 42 at non-overlapping times. Alternatively, the second communications controller 20' may be configured to generate and transmit the voltage sync pulses 212 on different ones of the digital communications interfaces 30, 34, 38, 42 at non-overlapping times. For example, the second communications controller 20' may produce the staggered voltage sync pulses 212 at regular and non-overlapping times in response to a single command from the electronic control unit 12. Such staggered voltage sync pulses 212 generated and transmitted by the second communications controller 20' may be similar or identical to those shown on the different plots 202, 204, 206, 208 of FIG. 3.

The plots 202, 204, 206, 208 of the second timing diagram 200 show and example embodiment in which the digital communications interfaces 30, 34, 38, 42 are all operating at a same data rate of 2 kHz. However, the non-overlapping voltage sync pulses may be performed at any data rate or with the digital communications interfaces 30, 34, 38, 42 operating at two or more different data rates.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

What is claimed is:

1. An electronic controller comprising:
an electronic control unit including a first serial interface;
a communications controller including a second serial interface and a digital communications interface, the second serial interface in direct communication with the first serial interface via a serial interconnection, and the digital communications interface configured to communicate with a remote sensor;
wherein the communications controller is configured to transmit a voltage sync pulse via the digital communications interface to a sensor in response to a synchronization command received from the electronic control unit via the serial interconnection; and
wherein the voltage sync pulse is one of a plurality of voltage sync pulses transmitted by the communications controller at a regular interval in response to a command received from the electronic control unit via the serial interconnection.

2. The electronic controller of claim 1, wherein the digital communications interface is configured to use PSI5 compliant signaling.

3. The electronic controller of claim 1, wherein the first serial interface and the second serial interface are each Serial Peripheral Interface (SPI) interfaces.

4. The electronic controller of claim 1, wherein the serial interconnection is the only interface between the electronic control unit and the communications controller.

5. The electronic controller of claim 1, wherein the communications controller is configured to change the regular interval in response to a data rate command received from the electronic control unit.

6. The electronic controller of claim 1, wherein the digital communications interface is one of a plurality of digital communications interfaces of the communications controller; and wherein the communications controller is configured to transmit the voltage sync pulse by each of the plurality of digital communications interfaces in response to the synchronization command received from the electronic control unit via the serial interconnection.

7. The electronic controller of claim 6, wherein at least one of the electronic control unit or the communications controller is configured to cause the communications controller to transmit the voltage sync pulse by each of the plurality of digital communications interfaces at non-overlapping times.

8. The electronic controller of claim 6, wherein the voltage sync pulse is one of a plurality of voltage sync pulses transmitted at a regular interval; and wherein the communications controller is configured to transmit the plurality of voltage sync pulses by two or more of the plurality of digital communications interfaces at different timing intervals.

9. The electronic controller of claim 8, wherein the communications controller is configured to transmit the plurality of voltage sync pulses by two or more of the plurality of digital communications interfaces at different timing intervals in response to the synchronization command received from the electronic control unit.

10. A restraint control system comprising the electronic controller of claim 1.

11. A communications controller comprising: a serial interface and a digital communications interface configured to communicate with a remote sensor; and wherein the communications controller is configured to transmit a voltage sync pulse via the digital communications interface to the remote sensor in response to a synchronization command received via the serial interface; and wherein the voltage sync pulse is one of a plurality of voltage sync pulses transmitted by the communications controller at a regular interval in response to a command received via the serial interface.

12. The communications controller of claim 11, wherein the digital communications interface has PSI5 timing compliance.

13. The communications controller of claim 11, wherein the serial interface is a Serial Peripheral Interface (SPI) interface.

14. The communications controller of claim 11, wherein the serial interface is the only interface configured to cause the communications controller to transmit the sync pulse.

15. The electronic controller of claim 11, wherein the communications controller is configured to change the regular interval in response to a data rate command received via the serial interface.

16. The communications controller of claim 11, wherein the digital communications interface is one of a plurality of digital communications interfaces of the communications controller; and wherein the communications controller is configured to transmit the voltage sync pulse by each of the plurality of digital communications interfaces in response to the synchronization command received via the serial interface.

17. The communications controller of claim 16, wherein the voltage sync pulse is one of a plurality of voltage sync pulses transmitted at a regular interval; and wherein the communications controller is configured to transmit the plurality of voltage sync pulses by two or more of the plurality of digital communications interfaces at different timing intervals.

18. The communications controller of claim 16, wherein the voltage sync pulse is one of a plurality of voltage sync pulses transmitted at a regular interval; and
  wherein the communications controller is configured to transmit the plurality of voltage sync pulses by each of the plurality of digital communications interfaces at non-overlapping times.

\* \* \* \* \*